(12) United States Patent
Hara et al.

(10) Patent No.: US 9,073,415 B2
(45) Date of Patent: Jul. 7, 2015

(54) SUNSHADE DEVICE

(75) Inventors: Shigeo Hara, Shioya-gun (JP); Shoichi Yokoyama, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/343,225

(22) PCT Filed: Sep. 4, 2012

(86) PCT No.: PCT/JP2012/072447
§ 371 (c)(1),
(2), (4) Date: Mar. 6, 2014

(87) PCT Pub. No.: WO2013/038951
PCT Pub. Date: Mar. 21, 2013

(65) Prior Publication Data
US 2014/0224438 A1 Aug. 14, 2014

(30) Foreign Application Priority Data
Sep. 12, 2011 (JP) ................................. 2011-198318

(51) Int. Cl.
*B60J 3/02* (2006.01)
*B60J 7/06* (2006.01)
*B60J 1/20* (2006.01)
*B60J 7/00* (2006.01)

(52) U.S. Cl.
CPC ................ *B60J 7/067* (2013.01); *B60J 1/2044* (2013.01); *B60J 7/0015* (2013.01)

(58) Field of Classification Search
CPC ......... B60J 7/067; B60J 7/0015; B60J 1/2044
USPC .............. 296/214; 160/120, 241, 265, 290.1, 160/DIG. 10
See application file for complete search history.

(56) References Cited

U.S. PATENT DOCUMENTS 4,819,382 A 4/1989 Suzuki et al.

FOREIGN PATENT DOCUMENTS

| EP | 0 735 229 | 10/1996 |
|---|---|---|
| JP | 60-259525 | 12/1985 |
| JP | S61-110424 | 7/1986 |
| JP | 63-156853 | 10/1988 |
| JP | 2002-054369 | 2/2002 |
| JP | 2007-168701 | 7/2007 |
| JP | 4171473 | 8/2008 |
| JP | 2008-265413 | 11/2008 |
| JP | 2009-101728 | 5/2009 |

OTHER PUBLICATIONS

European Search Report dated Apr. 30, 2015, 7 pages.

*Primary Examiner* — Dennis H Pedder
(74) *Attorney, Agent, or Firm* — Rankin, Hill & Clark LLP

(57) ABSTRACT

A sunshade device disposed in an opening of a vehicle includes a pair of winding devices, a sheet-like shade member wound in each of the winding devices and drawable therefrom; a frame member disposed at a draw-out end of each shade member so as to extend along an end edge thereof; and a sealing member that closes a portion between the draw-out ends of the side shade members in a closed-shade state where the draw-out ends of both shade members are abutted with each other in a substantial center of the opening of the vehicle. The frame of the other side shade member includes a hollow cross-sectional portion extending along the end edge of the draw-out end of the other side shade member, and the sealing member is brought into contact with the hollow cross-sectional portion.

7 Claims, 6 Drawing Sheets

SUNSHADE DEVICE

TECHNICAL FIELD

The present invention relates to a sunshade device which is disposed in an opening such as a vehicle sunroof opening.

Priority is claimed on Japanese Patent Application No. 2011-198318, filed Sep. 12, 2011, the content of which is incorporated herein by reference.

BACKGROUND ART

A sunroof has been known which has a glass panel mounted on an opening in a roof of a vehicle. In some cases of the sunroof, depending on occupant's preference, a sunshade device is installed in a vehicle interior side having the opening in the roof, so as to block incident light from outside of the vehicle.

The sunshade device has been known in which a shade member having a plate made of synthetic resin is slidably installed in the vehicle interior side having the opening in the roof (for example, refer to PTL 1), or the sunshade device has been known in which a sheet-like shade member (screen) is accommodated in a winding device so as to be drawable from the winding device which is installed in the opening in the roof (for example, refer to PTL 2).

The sunshade device disclosed in PTL 1 has a configuration in which a pair of plate-shaped shade members is installed in the vehicle interior side having the opening in the roof so as to be slidable to the right and left in a vehicle width direction, and an occupant in the vehicle performs opening and closing operations by manually gripping the shade members. In addition, the sunshade device has a structure in which the opening in the roof is opened by sliding both shade members to right and left ends, and the opening is closed by abutting inner end surfaces with each other in the width direction of the shade members. However, a sealing member for preventing light from leaking out through a portion between the shade members in a closed-shade state is disposed on the inner end surfaces of both shade members in the width direction, which are abutted with each other.

The sunshade device disclosed in PTL 2 has a configuration in which a pair of winding devices accommodating sheet-like shade members is installed in the center in the width direction of a sunroof opening and the shade members accommodated in the winding devices are drawn out to the right and left ends in the vehicle width direction. In addition, in this sunshade device, in order to enhance operability, a rod-shaped frame member (core) is disposed in a draw-out end of the sheet-like shade members so as to extend along an edge of the draw-out end.

CITATION LIST

Patent Literature

[PTL 1] Japanese Patent No. 4171473
[PTL 2] Japanese Utility Model Application. No. S59-1991.46 (Japanese Unexamined Utility Model Application, First Publication No. S61-110424)-Microfilm

SUMMARY OF INVENTION

Technical Problem

Currently, in order to secure a larger opening area when a shade is open, a method has been studied in which winding devices are installed at both side separated positions of an opening of a vehicle body, and sheet-like shade members drawn out from both winding devices are abutted with each other at a substantially central position of the opening.

In this case, as disclosed in PTL 2, it is necessary to install a frame member in a draw-out end of each shade member so as to extend along an end edge. However, the frame member of the sheet member is positioned in a substantially central portion of the opening of the vehicle body in a closed-shade state. Therefore, there is an increasing possibility that an occupant in the vehicle may come into contact with the frame member when the shade members are closed. Accordingly, the frame member installed in the draw-out end of the shade member requires such rigidity as to prevent deformation even if external force is applied thereto from the occupant.

In addition, it is necessary to dispose a sealing member in the draw-out end of the shade member in order to prevent leakage of light when the shade members are closed. However, as disclosed in PTL 1, if the sealing members are disposed in the draw-out ends of both shade members, there is an increasing possibility that one sealing member may irregularly run on the other sealing member in a closed-shade state. In this case, there is a disadvantage in that an outer appearance is degraded and light-shielding properties are degraded.

Therefore, an aspect according to this invention aims to provide a sunshade device which can ensure improvement in rigidity of a draw-out end of a shade member, an improvement in outer appearance quality and an improvement in light-shielding properties in a closed-shade state.

Solution to Problem

The sunshade device of the aspect according to this invention adopts the following configurations in order to solve the above-described problems.

(1) An aspect according to the present invention is to provide a sunshade device disposed in an opening of a vehicle. The sunshade device includes a pair of winding devices arranged to be separated from each other; a sheet-like shade member wound in each of the winding devices to be drawable therefrom; a frame member disposed at a draw-out end of each shade member so as to extend along an end edge thereof; and a sealing member that closes a portion between the draw-out end of one side shade member and the draw-out end of the other side shade member, in a closed-shade state where the draw-out ends of both shade members are abutted with each other in a substantial center of the opening of the vehicle. The sealing member is disposed in the draw-out end of one side shade member so as to extend along the end edge thereof. A hollow cross-sectional portion extending along the end edge of the draw-out end of the other side shade member is disposed in the frame member of the other side shade member. The sealing member is brought into contact with the hollow cross-sectional portion of the frame member of the other side shade member in the closed-shade state.

Accordingly, in the closed-shade state, the sealing member disposed in the draw-out end side of one side shade member is bought into contact with the highly rigid hollow cross-sectional portion of the frame member of the other side shade member.

(2) In the aspect of the above-described (1), a shade holding portion which holds the end edge of the draw-out end side of the other side shade member in the frame member of the other side shade member may be disposed in a vehicle interior side of the hollow cross-sectional portion, and the shade holding portion may cause the other side shade member to cover a surface facing the vehicle interior and a surface facing one side shade member.

Accordingly, the shade holding portion arranged in the vehicle interior side of the hollow cross-sectional portion of the frame member holds the end edge of the other side shade member, and the shade member covers the surface facing the vehicle interior and the surface facing one side shade member. In addition, in the closed-shade state, the sealing member of one side shade member is brought into contact with the hollow cross-sectional portion of the vehicle exterior side of the shade holding portion of the other side shade member.

(3) in the aspect of the above-described (2), a contact surface with the sealing member of the hollow cross-sectional portion may be arranged at a position further separated from one side shade member than the surface facing one side shade member of the shade holding portion.

Accordingly, the contact surface of the hollow cross-sectional portion which is brought into contact with the sealing member is positioned in the side separated from one side shade member to the surface facing one side shade member of the shade holding portion. Therefore, the contact surface is unlikely to be viewed when viewed from the vehicle interior side.

(4) in the aspect of the above-described (2) or (3), the shade holding portion may include a groove portion which opens to face one side shade member in a region adjacent to the hollow cross-sectional portion, which is the vehicle interior side of the hollow cross-sectional portion, and the draw-out end of the other side shade member may be locked by the groove portion.

Accordingly, the draw-out end of the other side shade member is locked by the groove portion of the shade holding portion, a region from the surface facing one side shade member across the groove portion, within the shade holding portion, is covered with the other side shade member. In addition, the draw-out end of the other side shade member is locked by a portion of a wall of the hollow cross-sectional portion inside the groove portion.

(5) In the aspect of any one of the above-described (1) to (4), the sealing member may include a first tilted surface which extends from an attachment base to be attached to one side shade member in a draw-out direction of the shade member, and which is tilted to the vehicle interior side from the attachment base facing toward the draw-out direction of the shade member, and a second tilted surface which is tilted to a vehicle exterior side from a distal end portion of the first tilted surface facing toward the draw-out direction of the shade member. A distal end side of the second tilted surface may be brought into contact with the hollow cross-sectional portion of the other side shade member.

Accordingly, in the closed-shade state, if the draw-out end of one side shade member approaches the draw-out end of the other side shade member, the distal end side of the second tilted surface within the sealing member is first brought into contact with the hollow cross-sectional portion of the other side shade member, thereby gradually increasing stress acting in an extension direction of the sealing member. As a result, the sealing member is bent so as to be convex toward the vehicle interior side by using a portion between the first tilted surface and the second tilted surface as a base point. A bending portion thereof is protruded to the vehicle interior side between the draw-out ends of both shade members.

(6) In the aspect of the above-described (5), the second tilted surface may be formed to have an extension length which is longer than that of the first tilted surface.

Accordingly, the second tilted surface of the distal end side which has the long extension length is brought into contact with the hollow cross-sectional portion of the other side shale member, thereby flexibly following the contact surface of the hollow cross-sectional portion.

(7) In the aspect of any one of the above-described (1) to (6), the frame member of one side shade member may include a second hollow cross-sectional portion which extends along the end edge of the draw-out end of one side shade member, and a concave portion which opens so as to face the other side shade member in a region adjacent to the second hollow cross-sectional portion, which is the vehicle interior side of the second hollow cross-sectional portion. The concave portion may be formed to be recessed at a wall of the second hollow cross-sectional portion adjacent to the concave portion toward an inside of the second hollow cross-sectional portion, and the sealing member may be held by the concave portion.

Accordingly, the sealing member is inserted into the concave portion of the frame member of one side shade member, and inside the concave portion thereof, the sealing member is held by a portion of the wall of the second hollow cross-sectional portion having high rigidity.

Advantageous Effects of Invention

According to the aspect of the above-described (1), the hollow cross-sectional portion extending along the end edge of the draw-out end is disposed in the frame member of the draw-end side of the other side shade member. Therefore, it is possible to reliably strengthen the rigidity of the draw-out end of the other side shade member by using the hollow cross-sectional portion. Moreover, the sealing member of the draw-out end of one side shade member is brought into contact with the high rigid hollow cross-sectional portion of the frame member in the closed-shade state, thereby being stably and elastically deformed. Therefore, it is possible to prevent degradation of the outer appearance quality or degradation of the light-shielding properties which is caused by the sealing member being irregularly deformed.

According to the aspect of the above-described (2), the shade holding portion is disposed in the vehicle interior side of the hollow cross-sectional portion within the frame member of the other side shade member, and the surface facing the vehicle interior of the shade holding portion and the surface facing one side shade member are covered with the other side shade member. Therefore, it is possible to adopt a configuration where the frame member of the other side shade member is unlikely to be viewed from the vehicle interior side. Moreover, the hollow cross-sectional portion with which the sealing member is brought into contact in the closed-shade state is arranged in the further vehicle exterior side than the shade holding portion. Therefore, it is possible to adopt a configuration where the contact portion between the sealing member and the hollow cross-sectional portion is unlikely to be viewed from the vehicle interior side. In addition, the hollow cross-sectional portion which is the contact portion with the sealing member is positioned in the further vehicle exterior side than the end edge of the other side shade member which covers the shade holding portion. Therefore, in this manner, it is possible to suppress wrinkles on the shade member which are caused by the shade member being directly brought into contact with the other side shade member. Accordingly, it is possible to further ensure the improvement in the outer appearance quality.

According to the aspect of the above-described (3), the contact surface of the hollow cross-sectional portion is positioned in the side separated from one side shade member to the surface facing one side shade member of the shade holding portion. Therefore, it is possible to further ensure the improvement in the outer appearance quality and the improvement in the light-shielding properties by adopting a configuration where the contact surface of the hollow cross-sectional portion is unlikely to be viewed from the vehicle interior side.

In addition, according to the aspect, the shade holding portion is arranged to be closer to the draw-out end of one side shade member as compared to the hollow cross-sectional portion. Therefore, it is possible to suppress excessive deformation of the sealing member in the closed-shade state and to cause the shade members to be closer to each other by securing a separated distance between the hollow cross-sectional portion and the draw-out end of one side shade member. Accordingly, it is possible to secure sufficient light-shielding properties in the closed-shade state and to further ensure the improvement in the outer appearance quality.

According to the aspect of the above-described (4), it is possible to lock the draw-out end of the other side shade member by using a portion of the wall of the hollow cross-sectional portion inside the groove portion. Therefore, it is possible to sufficiently strengthen holding rigidity of the other side shade member.

In addition, according to the aspect, it is possible to cover even a portion adjacent to the hollow cross-sectional portion with the other side shade member. Therefore, it is possible to enhance the outer appearance quality by adopting a configuration where the frame member is unlikely to be viewed from the outside.

According to the aspect of the above-described (5), in the closed-shade state, the sealing member is bent and deformed so as to be convex toward the vehicle interior side by using a portion between the first tilted surface and the second tilted surface as a base point. Therefore, it is possible to further enhance the outer appearance quality by reducing a step between the shade member and the sealing member when viewed from the vehicle interior side.

According to the aspect of the above-described (6), the extension length of the second tilted surface is longer than the extension length of the first tilted surface. Therefore, in the closed-shade state, it is possible to improve the light-shielding properties by causing the second tilted surface to flexibly follow the hollow cross-sectional portion of the other shade member.

Furthermore, according to the aspect, after the sealing member is elastically deformed in the closed-shade state, the bending portion between the first tilted surface and the second tilted surface is arranged at a substantially intermediate position of both shade members. Therefore, when viewed from the vehicle interior side, a protruding portion of the bending portion is aligned with a gap between both shade members, thereby further improving the outer appearance.

According to the aspect of the above-described (7), the sealing member is inserted into the concave portion of the frame member of one side shade member and is held by a portion of the wall of the second hollow cross-sectional portion having the highly rigidity, inside the concave portion. Therefore, it is possible to strengthen the rigidity of the draw-out end side of one side shade member and it is also possible to strengthen the holding rigidity of the sealing member.

In addition, according to the aspect, the concave portion which holds the sealing member is formed by recessing the wall of the second hollow cross-sectional portion adjacent to the concave portion in an inward direction of the second hollow cross-sectional portion. Therefore, without increasing the size of the cross section of the frame member of one side shade member, it is possible to ensure the sufficient holding rigidity in the sealing members.

DESCRIPTION OF EMBODIMENTS

Figure 1:
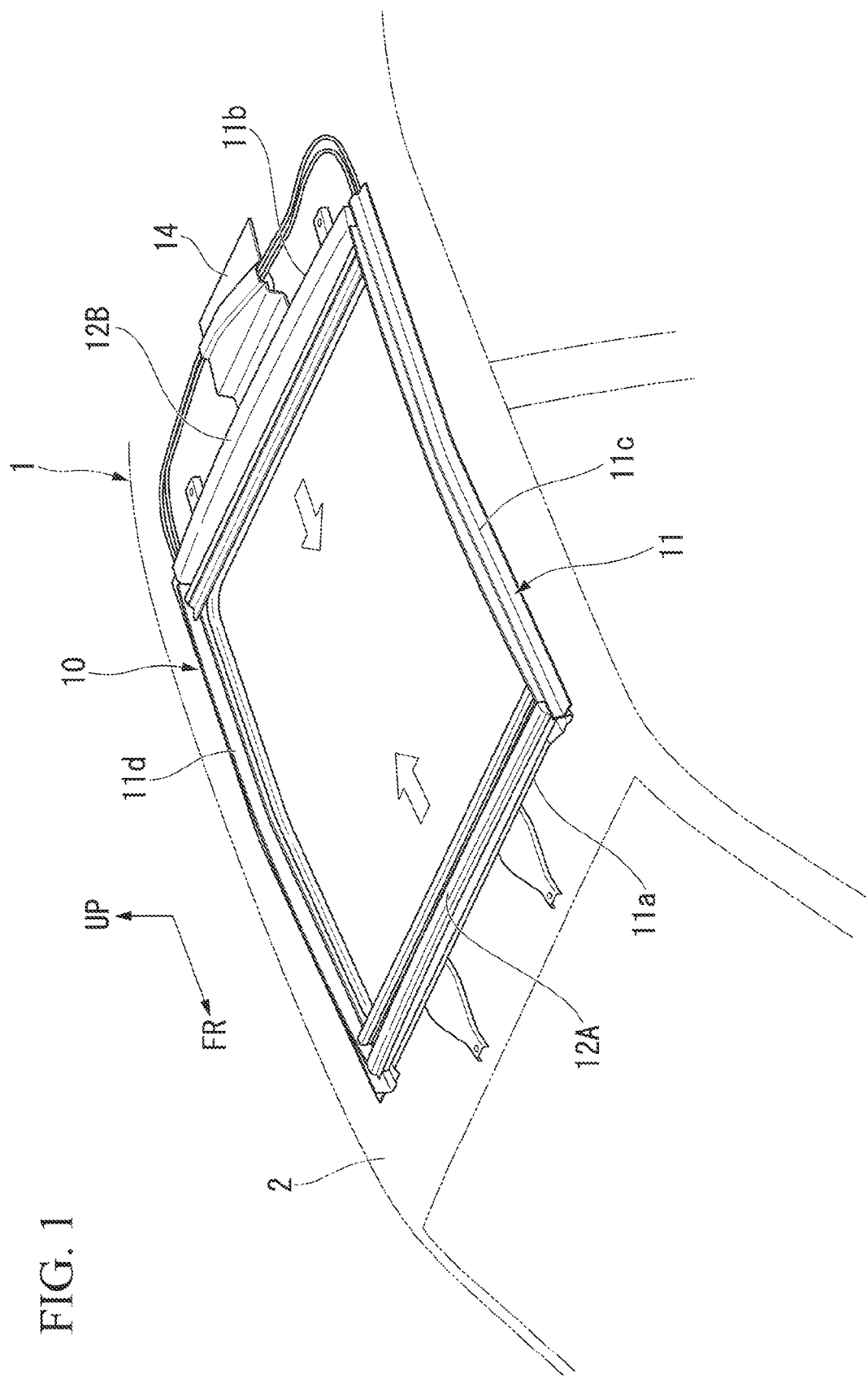
FIG. 1 is a perspective view when a sunshade device of a first embodiment according to the present invention is viewed from a vehicle exterior side.

Hereinafter, an embodiment according to the present invention will be described with reference to the drawings. In the following description, unless otherwise particularly described, the terms of "front", "rear", "upper" and "lower" mean "front", "rear", "upper" and "lower" in a state where a device is attached to a vehicle. In addition, in the drawings, an arrow FR indicates a front side of a vehicle 1, and an arrow UP indicates an upper side of the vehicle 1.

Figure 2:
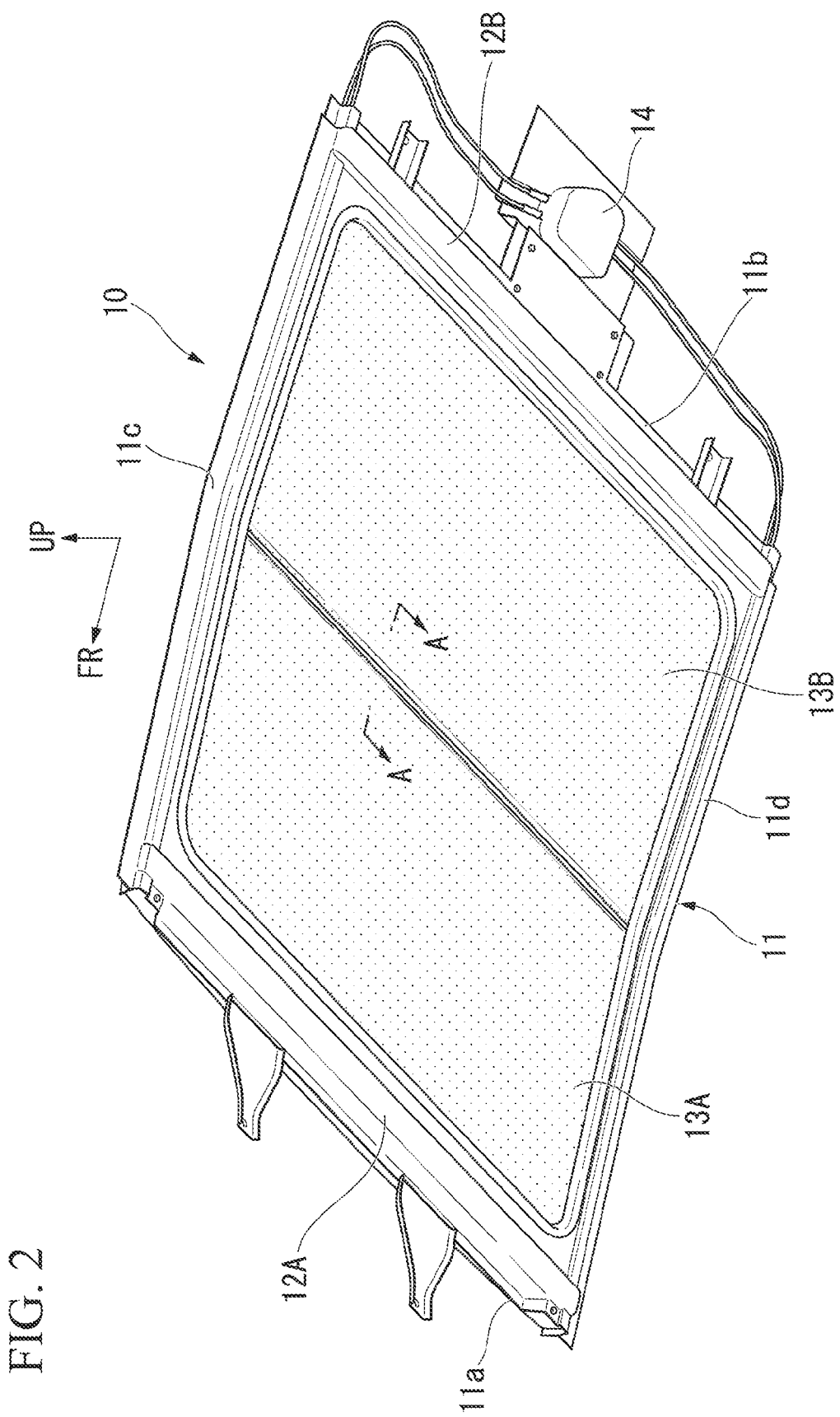
FIG. 2 is a perspective view when the sunshade device is viewed from a vehicle interior side.

FIG. 1 is a perspective view when a sunshade device 10 of this embodiment is viewed from an upper side (vehicle exterior side) of a roof 2 of the vehicle 1 FIG. 2 is a perspective view when the sunshade device 10 is viewed from a vehicle interior side.

The reference number 11 is a rectangular device frame of the sunshade device 10 to be attached to an edge portion of a sunroof opening (opening portion: not illustrated) of the roof 2 of the vehicle 1, from the vehicle interior side. The device frame 11 is installed along a longitudinal direction of the vehicle 1. Winding devices 12A and 12B are respectively installed in a front frame portion 11a of a vehicle front side and a rear frame portion 11b of a vehicle rear side.

In the respective winding devices 12A and 12B, sheet-like shade members 13A and 13B such as cloth or the like are wound so as to be drawable, inside a case (reference numeral omitted) extending along a vehicle width direction. The shade member 13A is drawn out rearward from the winding device 12A of the vehicle front side, and the shade member 13B is drawn out forward from the winding device 12B of the vehicle rear side. In the respective shade members 13A and 13B, a base end in a draw-out direction is spring-energized in a winding direction in each case of the winding devices 12A and 12B. A distal end (referred to as "draw-out end") side of the draw-out direction is held to be slidably displaced to side frame portions 11c and 11d of both sides in the right and left of the device frame 11. In addition, the draw-out end of the respective shade members 13A and 13B is driven to be operated back and forth in the draw-out direction by the power of an electric motor 14 (drive actuator). As illustrated in FIG. 2, the draw-out ends of both shade members 13A and 13B are drawn out up to a central position in the longitudinal direction of the device frame 11, thereby closing the sunroof opening of the vehicle 1 from the vehicle interior side.

Figure 3:
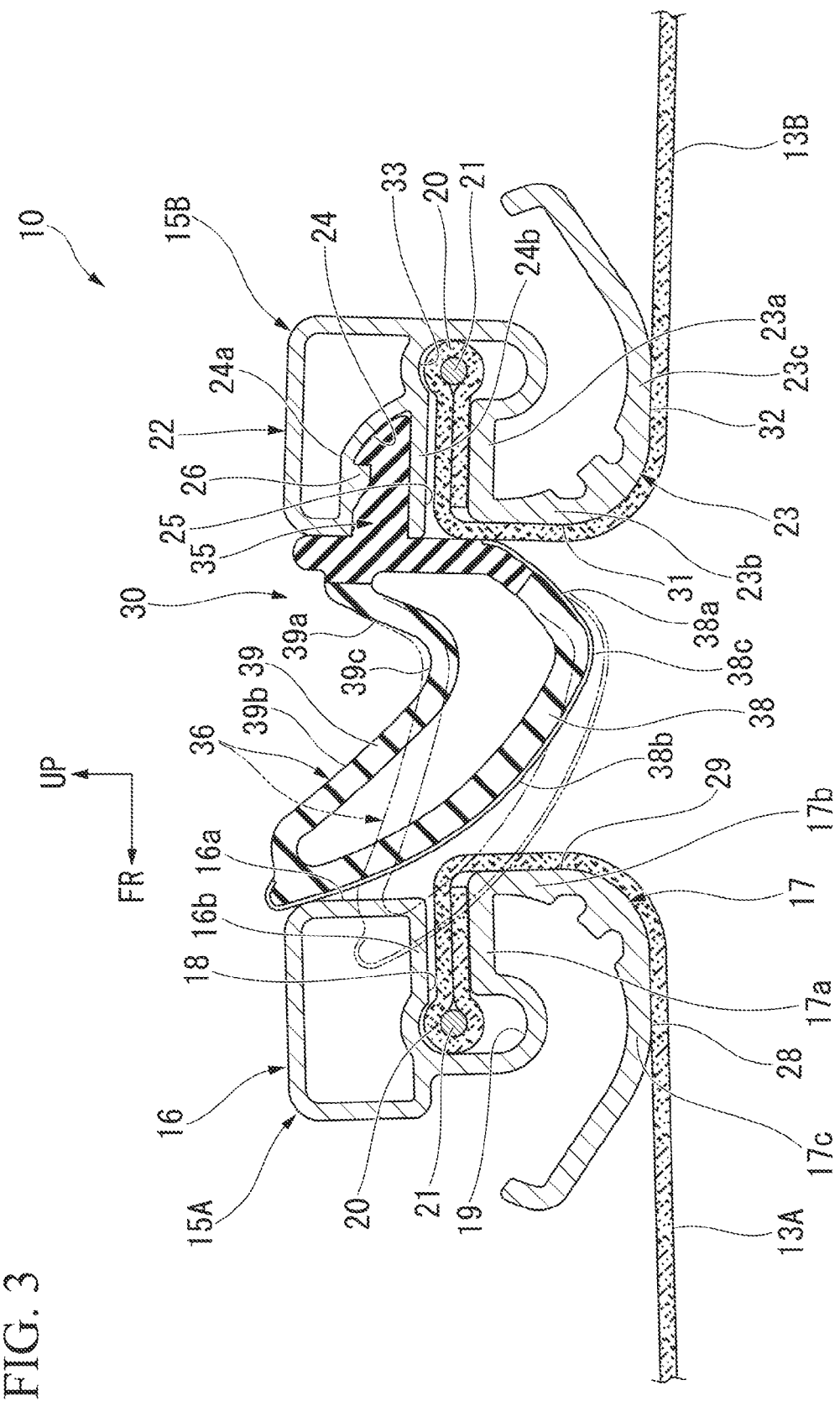
FIG. 3 is an enlarged cross-sectional view of the sunshade device which corresponds to a cross section taken along line A-A in FIG. 2.

FIG. 3 is a cross-sectional view of the sunshade device 10 in a closed-shade state, which corresponds to a cross section taken along line A-A in FIG. 2.

As illustrated in FIG. 3, elongated frame members 15A and 15B made of aluminum alloy are disposed in associated draw-out ends of both shade members 13A and 13B, along an end edge thereof (in the description, the description of "along the end edge of the shade member" means the description of "along a direction perpendicular to the draw-out direction" of the shade member). The frame members 15A and 15B are formed to have a substantially constant cross section over the longitudinal direction. A rubber-made sealing member 30 which closes a portion between the draw-out ends of the front and rear shade members 13A and 13B in the closed-shade state is attached to the rear side frame member 15B. In addition, both end portions of the frame members 15A and 15B in the longitudinal direction are held to be slidable to side frame portions 11c and 11d of the device frame 11, and connected to a power transmission mechanism (not illustrated) which transmits the power of the electric motor 14.

Figure 4:
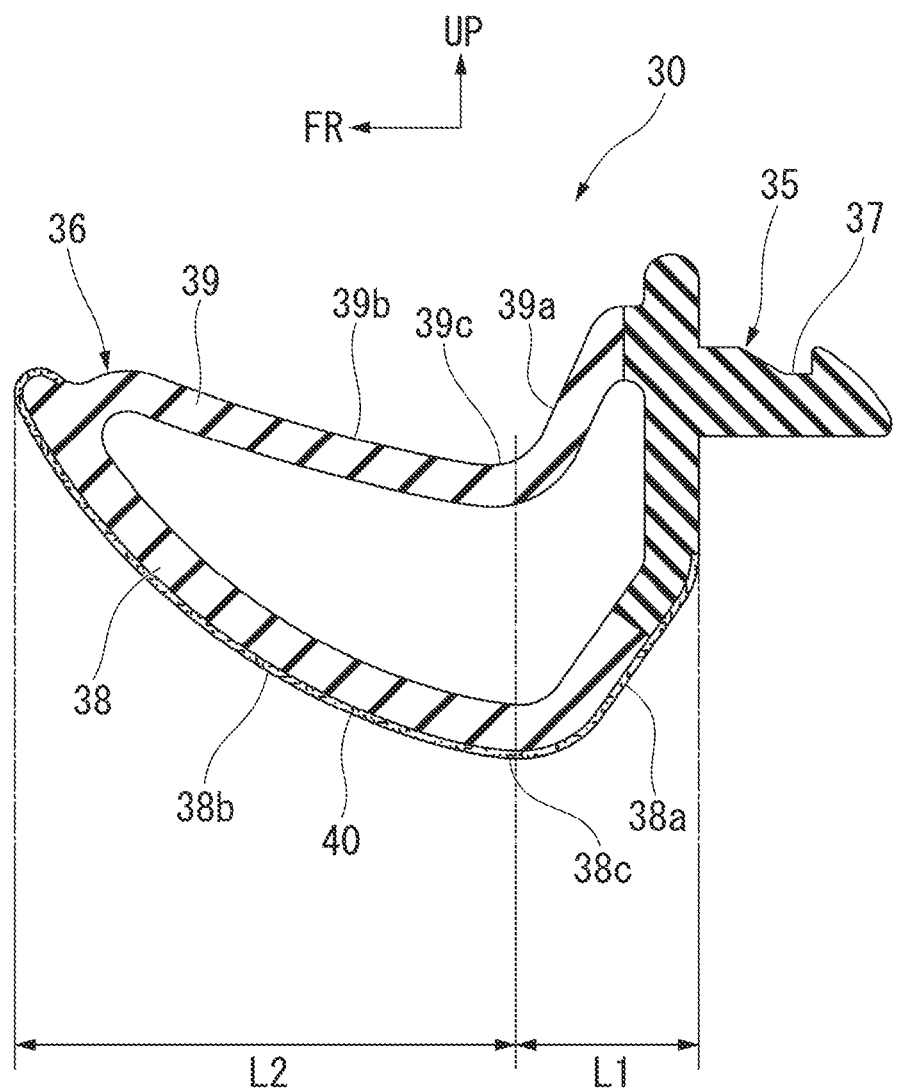
FIG. 4 is a cross-sectional view of a sealing member to be attached to one side frame member of the sunshade device.
Figure 5:
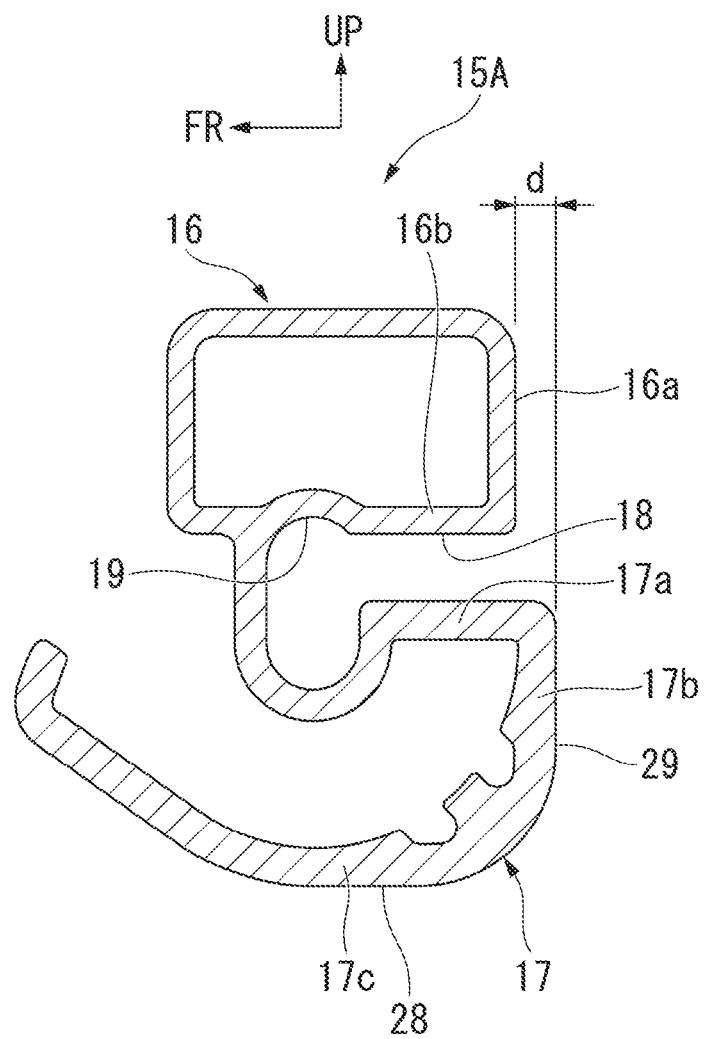
FIG. 5 is a cross-sectional view of one side frame member of the sunshade device.
Figure 6:
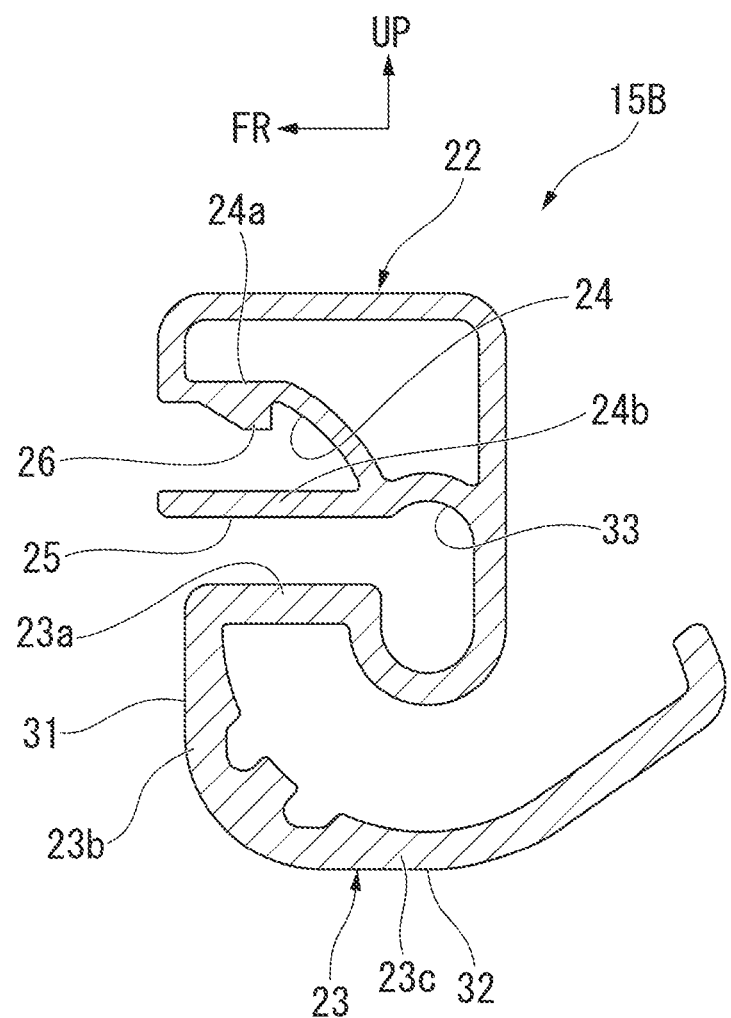
FIG. 6 is a cross-sectional view of the other side frame member of the sunshade device.

FIG. 4 is a cross sectional view of the sealing member 30, similar to FIG. 3. FIGS. 5 and 6 are cross-sectional views of the front and rear side frame members 15A and 15B, similar to FIG. 3.

As illustrated in FIGS. 3 and 5, the front side frame member 15A includes a hollow cross-sectional portion 16 which is mainly in charge of rigidity maintenance in a crushing direction of the cross section and bending rigidity maintenance in the longitudinal direction; a shade holding portion 17 which is extended to the vehicle interior side (lower side in FIG. 2) of the hollow cross-sectional portion 16; and a groove portion 18 which is disposed between the hollow cross-sectional portion 16 and the shade holding portion 17 and opens so as to face the rear side shade member 13B.

The hollow cross-sectional portion 16 is formed to have a hollow cross section with a substantially rectangular shape. A rear side surface thereof which faces the rear side shade member 13B serves as a contact surface 16a which is brought into contact with the sealing member 30 in a closed-shade state.

The shade holding portion 17 is formed to have a U-shaped cross section, and a distal end of an upper wall 17a thereof is connected to a lower wall 16b of the hollow cross-sectional portion 16. The shade holding portion 17 is configured so that an outer surface 29 of a rear wall 17b thereof faces the rear side shade member 13B and a lower surface 28 of a lower wall 17c faces a vehicle interior.

The groove portion 18 is disposed between the upper wall 17a of the shade holding portion 17 and the lower wall 16b of the hollow cross-sectional portion 16. The groove portion 18 is formed so that an opening side region thereof has a slit shape in which the upper wall 17a and the lower wall 16b are substantially parallel with each other. A widened portion 19 having an elongated hole shape which is substantially orthogonal to the slit shape of the opening side is disposed in a region of a bottom side.

As illustrated in FIG. 3, an edge portion of the draw-out end of the front side shade member 13A enfolds the lower surface 28 and the outer surface 29 of the shade holding portion 17 from outside. In this state, a terminal portion is inserted into the groove portion 18, and is locked by the shade holding portion 17. More specifically, a tubular portion 20 sewn into a bag shape is disposed in the terminal portion of the draw-out end side of the shade member 13A. In a state where the terminal portion is inserted into the groove portion 18, a core rod 21 is inserted into the tubular portion 20 inside the widened portion 19. In this manner, the terminal portion is locked inside the groove portion 18 so as not to slip out therefrom.

In addition, the rear side contact surface 16a of the hollow cross-sectional portion 16 with which the sealing member 30 comes into contact is not formed to be flush with the outer surface 29 of the shade holding portion 17, but is formed to be offset forward (in a direction separated from the rear side shade member 13B) with respect to the outer surface 29 by a predetermined distance d.

In contrast, as illustrated in FIGS. 3 and 6, the rear side frame member 15B includes a hollow cross-sectional portion 22 (second hollow cross-sectional portion) which is mainly in charge of the rigidity maintenance in the crushing direction of the cross section and the bending rigidity maintenance in the longitudinal direction; a shade holding portion 23 which is disposed in the vehicle interior side of the hollow cross-sectional portion 22 (lower side in FIG. 2); a concave portion 24 which is disposed between the hollow cross-sectional portion 22 and the shade holding portion 23, and opens so as to face the front side shade member 13A; and a groove portion 25 which is disposed to be adjacent to the concave portion 24 and the shade holding portion 23, and opens so as to face the front side shade member 13A.

The hollow cross-sectional portion 22 is configured so that a portion of the front wall is recessed into a concave shape, as compared to a basic shape which is substantially rectangular similar to the hollow cross-sectional portion 16 of the front side frame member 15A. In this manner, the hollow cross-sectional portion 22 has a substantially L shape. The concave portion 24 is formed to have a portion recessed in the concave shape as described above. The concave portion 24 is a portion for holding the sealing member 30. A locking projection 26 for restricting slippage of the sealing member 30 is disposed in a portion of an upper wall 24a of the concave portion 24.

Similar to the front side frame member ISA, the shade holding portion 23 is formed in a U-shaped cross section, and a distal end portion of the upper wall 23a is connected to a lower end of the hollow cross-sectional portion 22. The shade holding portion 23 is configured so that the outer surface 31 of the front wall 23b faces the front side shade member 13A and the lower surface 32 of the lower wall 23c faces the vehicle interior.

The grove portion 25 is disposed between the upper wall 23a of the shade holding portion 23 and the lower wall 24b of the concave portion 24. The groove portion 25 is formed so that an opening side region thereof has a slit shape in which the upper wall 23a and the lower wall 24b are substantially parallel with each other. A widened portion 33 having an elongated hole shape which is substantially orthogonal to the slit shape of the opening side is disposed in a region of a bottom side.

As illustrated in FIG. 3, an edge portion of the draw-out end of the rear side shade member 13B enfolds the lower surface 32 and the outer surface 31 of the shade holding portion 23 from outside. In this state, a terminal portion is inserted into the groove portion 25 and is locked by the shade holding portion 23. The more specific locking manner in this portion is similar to a case of the above-described front side shade member 13A.

In addition, as illustrated in FIGS. 3 and 4, the sealing member 30 includes an attachment base 35 which is fixedly fitted to the concave portion 24 of the rear side frame member 15B, and a hollow lip 36 which is extended to the attachment base 35 and whose distal end region is brought into contact with the hollow cross-sectional portion 16 of the front side frame member 15A in a closed-shade state. The attachment base 35 is formed of hard rubber, and the hollow lip 36 is formed so that a main portion other than a connecting portion with the attachment base 35 has a soft sponge rubber.

The attachment base 35 is configured so that an engagement groove 37 is disposed on an upper surface side thereof and the locking projection 26 of the concave portion 24 side is engaged with the engagement groove 37 when the attachment base 35 is fitted to the concave portion 24 of the frame member 15B.

In addition, in a state where the attachment base 35 is fixed to the rear side frame member 15B, the distal end side of the hollow lip 36 is protruded in a substantially triangular shape toward the direction of the front side shade member 13A. Hereinafter, walls of the vehicle interior side and the vehicle exterior side which converge toward an extension end of the hollow lip 36 are respectively referred to as an inside wall 38 and an outside wall 39.

The inside wall 38 and the outside wall 39 has first tilted surfaces 38a and 39a which are tilted to the vehicle interior side from the attachment base 35 toward the shade draw-out direction, and second tilted surfaces 38b and 39b which are tilted to the vehicle exterior side from the distal end portion of the first tilted surfaces 38a and 39a toward the shade draw-out direction. Bending portions 38c and 39c which are bent into a convex shape to the vehicle interior side are respectively disposed between the first tilted surfaces 38a, 39a and the second tilted surfaces 38b, 39b.

As illustrated in FIG. 4, in lengths L1 and L2 of the first tilted surfaces 38a, 39a and the second tilted surfaces 38b, 39b in the shade draw-out direction (longitudinal direction of the vehicle), the length L2 of the second tilted surfaces 38b, 39b is longer than the length L1 of the first tilted surfaces 38a, 39a. As illustrated in FIG. 4, in the first tilted surfaces 38a, 39a and the second tilted surfaces 38b, 39b, with regard to the lengths in each extension direction, the second tilted surfaces 38b, 39b also have the longer length in the extension direction than that of the first tilted surfaces 38a, 39a.

In addition, as illustrated in FIG. 4, a skin member 40 which has the same color as the shade members 13A and 13B is deposited on an outer surface of the inside wall 38 which faces the vehicle interior side.

In the above-described configuration, as illustrated in FIG. 1, if the power of the electric motor 14 is transmitted to the draw-out end of the shade members 13A and 13B, starting from a state where the front and rear shade members 13A and 13B, both shade members 13A and 13B are drawn out in a direction where the draw-out ends are abutted with each other.

If the draw-out ends of both shade members 13A and 13B are close to each other in this manner, the sealing member 30 attached to the rear side frame member 15B is brought into contact with the hollow cross-sectional portion 16 of the front side frame member 15A as illustrated in FIG. 3.

More specifically, a distal end of the hollow lip 36 (second tilted surfaces 38b and 39b) of the sealing member 30 is first brought into contact with the contact surface 16a of the hollow cross-sectional portion 16 of the front side frame member 15A. As both shade members 13A and 13B are closer to each other, a compressive load along the draw-out direction is applied to the hollow lip 36. In this manner, the hollow lip 36 is elastically deformed to the vehicle interior side by using the bending portions 38c and 39c as base points, and increases the contact area with respect to the hollow cross-sectional portion 16. Thus, if both shade members 13A and 13B are closed up to a terminal end position, the second tilted surface 38b is in close contact with the contact surface 16a of the hollow cross-sectional portion 16 in the entire vehicle width direction, and the bending portion 38c of the inside wall 38 of the hollow lip 36 is protruded in a convex shape to a gap between the front side shade member 13A and the rear side shade member 13B.

As a result, the gap between the front and rear side shade members 13A and 13B is closed via the sealing member 30.

Hereinafter, an advantageous effect obtained by the sunshade device 10 of the present embodiment will be described.

This sunshade device 10 has a basic configuration where the hollow cross-sectional portion 16 extending along end edge of the draw-out end is disposed in the frame member 15A of the draw-out end side of the front side shade member 13A and the sealing member 30 of the rear side shade member 13B is brought into contact with the contact surface 16a of the hollow cross-sectional portion 16 in a closed-shade state. Accordingly, it is not only possible to sufficiently strengthen the rigidity of the draw-out end side of the front side shade member 13A by using the hollow cross-sectional portion 16, but also it is possible to stably bring the distal end region of the flexible sealing member 30 into close contact with the hollow cross-sectional portion 16 having the high rigidity.

Therefore, in this sunshade device 10, even if the frame member 15A is positioned in the center of the device frame 11 in a closed-shade state and then an occupant comes into contact with the frame member 15A, it is possible to suppress the deformation of the draw-out end side of the shade member 13A. Moreover, it is also possible to prevent the degradation of the outer appearance quality or the degradation of the light-shielding properties (light leakage) which is caused by the sealing member 30 being irregularly deformed.

In addition, in this embodiment, the hollow cross-sectional portion 22 is also disposed in the frame member 15B of the rear side shade member 13B so as to extend along the short edge of the draw-out end. Accordingly, it is possible to effectively prevent the deformation of the frame members 15A and 15B which is caused by external force in a closed-shade state. It is possible to stably receive the sealing reaction force of the sealing member 30 in the rear side frame member 15B.

In addition, in particular, in the device where the front and rear shade members 13A and 13B are automatically operated by the electric motor 14 (actuator) as in this embodiment, as compared to a type of device where each shade member is manually and individually operated, there is a tendency that variations in the gap between both shade members 13A and 13B are likely to increase. However, in a case of adopting this structure where the hollow cross-sectional portions 16 and 22 are disposed in the frame members 15A and 15B so as to extend along the end edges and in a closed-shade state, the sealing member 30 of one side frame member 15B is brought into contact with the hollow cross-sectional portion 16 of the other side frame member 15A, it is possible to effectively eliminate the problem caused by the variations in the gap between both shade members 13A and 13B.

That is, when the front and rear side shade members 13A and 13B are automatically operated by the actuator, both shade members 13A and 13B are operated by being linked with each other. Accordingly, the individual variations of the shade members 13A and 13B appear by being superimposed on each other when the shade members 13A and 13B are operated. Therefore, there is a tendency that the variations in the gap between the shade members 13A and 13B in the closed-shade state are further increased.

In the sunshade device 10 of this embodiment, it is possible to stably bring the sealing member 30 into contact with the hollow cross-sectional portion 16 of the other side frame member 15A in the closed-shade state by adopting the above-described configuration. Accordingly, even if there are variations to some extent in the gap between the shade members 13A and 13B, it is possible to effectively prevent the degradation of the outer appearance quality or the degradation of the light-shielding properties which is caused by the variations. Furthermore, when a detection device which detects foreign substances interposed between the shade members 13A and 13B is disposed, if the interposition cannot be detected at the entirely closed moment, the hollow lip 36 is allowed to have a deflection room to some extent. In this manner, it is possible to reduce the foreign substances and damage to the sunshade device 10.

In addition, in this sunshade device 10, the shade holding portions 17 and 23 are respectively arranged in the vehicle interior side of the hollow cross-sectional portions 16 and 22 of the front and rear side frame members 15A and 15B, and the outer surfaces 29 and 31 and the lower surfaces 28 and 32 of the shade holding portions 17 and 23 are respectively covered with the shade members 13A and 13B. Accordingly, in the closed-shade state, it is possible to improve the appearance by covering and concealing the frame members 15A and 15B by using the shade members 13A and 13B.

Then, in this sunshade device 10, the hollow cross-sectional portion 16 of the front side frame member 15A which is brought into contact with the sealing member 30 in the closed-shade state is arranged in the vehicle exterior side (upper side) of the shade holding portion 17. Accordingly, it is possible to adopt the configuration where the contact portion (region having a high possibility of light leakage) with the sealing member 30 is unlikely to be viewed from the vehicle interior side. In the closed-shade state, it is possible to suppress occurrence of wrinkles in the shade member 13A which is caused by the sealing member 30 directly coming into contact with the shade member 13A.

Furthermore, in a case of this embodiment, the front side frame member 15A is formed so that the contact surface 16a of the hollow cross-sectional portion 16 is offset further forward (in a direction separated from the rear side shade member 13B) than the outer surface 29 of the shade holding portion 17 by a predetermined distance d. Accordingly, it is possible to adopt a configuration where the contact surface with sealing member 30 is more unlikely to be viewed from the vehicle interior side in the closed-shade state. Then, in this embodiment, the contact surface 16a of the hollow cross-sectional portion 16 is arranged at a position further separated from the rear side shade member 13B than the outer surface 29 of the shade holding portion 17. Therefore, it is possible to suppress excessive deflection of the sealing member 30 in the closed-shade state, and it is possible to cause the draw-out ends of the shade members 13A and 13B to be sufficiently close to each other.

Therefore, it is possible to ensure the sufficient light-shielding properties in the closed-shade state, and it is possible to improve the outer appearance quality viewed from the vehicle interior side.

Furthermore, in the sunshade device 10 of this embodiment, the groove portion 18 which opens rearward is disposed in the region adjacent to the hollow cross-sectional portion 16 within the front side frame member 15A, and the draw-out end of the shade member 13A is locked by this groove portion 18. Accordingly, it is possible to reliably hold the draw-out end of the shade member 13A by a portion of the wall of the hollow cross-sectional portion 16 having the high rigidity inside the groove portion 18.

In addition, in this embodiment, the draw-out end of the shade member 13A is inserted into and locked by the groove portion 18. Accordingly, the region from the outer surface 29 of the shade holding portion 17 across the upper wall 17a is covered with the shade member 13A. Therefore, the frame member 15A is more unlikely to be viewed from the vehicle interior side.

In addition, the sealing member 30 of this sunshade device 10 has the first tilted surfaces 38a and 39a which are tilted to the vehicle interior side from the attachment base 35 side toward the shade draw-out direction, and the second tilted surfaces 38b and 39b which are tilted to the vehicle exterior side from the distal end portion of the first tilted surfaces 38a and 39a toward the shade draw-out direction. The distal end side of the second tilted surface 38b is brought into contact with the hollow cross-sectional portion 16 of the front side frame member 15A. Accordingly, in the closed-shade state, the hollow lip 36 is deformed to be convex to the vehicle interior side by using the bending portions 38c and 39c as base points. In this manner, it is possible to close the gap between the front and rear shade members 13A and 13B without forming any step. Therefore, this can improve the outer appearance quality viewed from the vehicle interior side.

Furthermore, the sealing member 30 is formed so that the second tilted surfaces 38b and 39b of the distal end side have the longer extension length than the first tilted surfaces 38a and 39a of the base end side. Accordingly, in the closed-shade state, it is possible to further improve the light-shielding properties by causing the second tilted surfaces 38b and 39b of the distal end side to flexibly follow the hollow cross-sectional portion 16 of the front side frame member 15A.

Then, in the sealing member 30, the relationship between the above-described extension lengths of the first tilted surfaces 38a, 39a and the second tilted surfaces 38b, 39b causes the sealing member 30 to be deformed in the closed-shade state. Thereafter, the bending portions 38c and 39c located between the first tilted surfaces 38a, 39a and the second tilted surfaces 38b, 39b are arranged in the intermediate positions of the front and rear shade members 13A and 13B. Therefore, the protruding portion of the bending portion 38c is aligned with the gap position between both shade members 13A and 13B when viewed from the vehicle interior, thereby further improving the outer appearance quality.

In addition, in the sealing member 30 of this embodiment, the second tilted surfaces 38b and 39b which are tilted in the direction of the vehicle exterior side are disposed in the distal end side. Accordingly, in the closed-shade state, it is possible to suppress that the distal end side of the sealing member 30 is strongly pressed to and brought into contact with the front side shade member 13A. Therefore, it is possible to prevent the occurrence of wrinkles on the shade member 13A in advance.

In addition, in this sunshade device 10, the concave portion 24 which opens forward is disposed in the region adjacent to the hollow cross-sectional portion 22 of the rear side frame member 15B, and the attachment base 35 of the sealing member 30 is held inside the concave portion 24 thereof. Accordingly, it is possible to strengthen the rigidity of the frame member 15B by using the hollow cross-sectional portion 22, and it is possible to reliably hold the sealing member 30 by using a portion of the wall of the hollow cross-sectional portion 22 having the high rigidity.

Furthermore, in a case of this embodiment, the concave portion 24 is formed so that a portion of the wall of the hollow cross-sectional portion 22 is recessed in the inward direction. Accordingly, while keeping the outer shape of the frame member 15B to have substantially the same size as the front side frame member 15A, it is possible to ensure the sufficient holding rigidity with respect to the sealing member 30.

This invention is not limited to the above-described embodiment, and can be modified in various design manners without departing from the gist of the invention.

For example, the above-described embodiment adopts the sunshade device in which a pair of shade members is slidably operated on the roof of the vehicle in the longitudinal direction of the vehicle. However, the pair of shade members may be slidably operated on the roof of the vehicle in the width direction of the vehicle. In addition, without being limited to the roof of the vehicle, the installation position of the sunshade device may be installed on a side portion of the vehicle or a rear window opening. In this case, the slidably operating direction of the pair of shade members may be a vertical direction.

REFERENCE SIGNS LIST 10 sunshade device
12A, 12B winding device
13A, 13B shade member
15A, 15B frame member
16 hollow cross-sectional portion
16a contact surface
17 shade holding portion
18 groove portion
22 hollow cross-sectional portion (second hollow cross-sectional portion)
24 concave portion
30 sealing portion
31 outer surface (surface facing one side shade member)
32 lower surface (surface facing vehicle interior)
35 attachment base
38a, 39a first tilted surface
38b, 39b second tilted surface

The invention claimed is:

1. A sunshade device disposed in an opening of a vehicle, comprising:
  a pair of winding devices arranged to be separated away from each other;
  a sheet-like shade member wound by each of the winding devices to be drawable therefrom;
  a frame member disposed at a draw-out end of each shade member so as to extend along an end edge thereof; and
  a sealing member that covers a portion between the draw-out end of one side shade member and the draw-out end of another side shade member, in a closed-shade state where the draw-out ends of both shade members are set close to each other in a substantial center of the opening of the vehicle,
  wherein the sealing member is disposed in the draw-out end of the one side shade member so as to extend along the end edge thereof,
  wherein a hollow cross-sectional portion extending along the end edge of the draw-out end of the other side shade member is disposed in the frame member of the other side shade member,
  wherein the sealing member is brought into contact with the hollow cross-sectional portion of the frame member of the other side shade member in the closed-shade state,
  wherein a shade holding portion which holds the end edge of the draw-out end side of the other side shade member in the frame member of the other side shade member is disposed in a vehicle interior side of the hollow cross-sectional portion,
  wherein the shade holding portion causes the other side shade member to cover a surface facing the vehicle interior and a surface facing the one side shade member,
  wherein a surface of the other side shade member facing the one side shade member is separated from the one side shade member via a gap, and
  wherein the sealing member closes the gap.

2. The sunshade device according to claim 1,
  wherein a contact surface with the sealing member of the hollow cross-sectional portion is arranged at a position further separated from the one side shade member than the surface facing the one side shade member of the shade holding portion.

3. The sunshade device according to claim 1,
  wherein the shade holding portion includes a groove portion which opens to face the one side shade member in a region adjacent to the hollow cross-sectional portion, which is the vehicle interior side of the hollow cross-sectional portion, and
  wherein the draw-out end of the other side shade member is locked by the groove portion.

4. The sunshade device according to claim 1,
  wherein the sealing member includes a first tilted surface which extends from an attachment base to be attached to the one side shade member in a draw-out direction of the shade member, and which is tilted to the vehicle interior side from the attachment base facing toward the draw-out direction of the shade member, and a second tilted surface which is tilted to a vehicle exterior side from a distal end portion of the first tilted surface facing toward the draw-out direction of the shade member, and
  wherein a distal end side of the second tilted surface is brought into contact with the hollow cross-sectional portion of the other side shade member.

5. The sunshade device according to claim 4,
  wherein the second tilted surface is formed to have an extension length which is longer than that of the first tilted surface.

6. The sunshade device according to claim 1,
  wherein the frame member of the one side shade member includes a second hollow cross-sectional portion which extends along the end edge of the draw-out end of the one side shade member, and a concave portion which opens so as to face the other side shade member in a region adjacent to the second hollow cross-sectional portion, which is the vehicle interior side of the second hollow cross-sectional portion,
  wherein the concave portion is formed to be recessed at a wall of the second hollow cross-sectional portion adjacent to the concave portion toward an inside of the second hollow cross-sectional portion, and
  wherein the sealing member is held by the concave portion.

7. The sunshade device according to claim 1,
  wherein a second hollow cross-sectional portion extending along the end edge of the draw-out end of the one side shade member is disposed in the frame member of the one side shade member,
  wherein a second shade holding portion which holds the end edge of the draw-out end side of the one side shade member in the frame member of the one side shade member is disposed in a vehicle interior side of the second hollow cross-sectional portion,
  wherein the second shade holding portion causes the other side shade member to cover a surface facing the vehicle interior and a surface facing the one side shade member, and
  wherein a surface of the other side shade member facing the one side shade member is separated from a surface of the one side shade member facing the other side shade member via a gap.

* * * * *